United States Patent [19]
Yoshida

[11] Patent Number: 5,814,957
[45] Date of Patent: Sep. 29, 1998

[54] DIRECT CURRENT BRUSHLESS MOTOR AND DRIVING METHOD THEREFOR

[75] Inventor: Makoto Yoshida, Kusatsu, Japan

[73] Assignee: Matsushita Electric Industrial Co., Ltd., Osaka-fu, Japan

[21] Appl. No.: 800,154

[22] Filed: Feb. 13, 1997

[30] Foreign Application Priority Data

Feb. 14, 1996 [JP] Japan .................................. 8-026396

[51] Int. Cl.⁶ .................................................. H01R 39/46
[52] U.S. Cl. .......................... 318/439; 318/254; 318/138; 318/599
[58] Field of Search .................... 318/254, 439, 318/138, 599

[56] References Cited

U.S. PATENT DOCUMENTS 5,166,586 11/1992 Yaguchi .................................. 318/434

Primary Examiner—Karen Masih
Attorney, Agent, or Firm—Panitch Schwarze Jacobs & Nadel, P.C.

[57] ABSTRACT

A direct current brushless motor has a control unit (8) for controlling a commutation of current flowing in a stator winding (3), a duty ratio of an applied voltage to the stator winding (3), and a carrier period for the duty ratio. The control unit (8) switches over between a first operating mode at a starting operation and a second operating mode at an ordinary operation in accordance with at least one of a rotational speed of the rotor (2) and time length from starting of the first starting mode. The control means (8) adjust the carrier period so that a first setting value to be adjusted in the first operating mode is larger than a second setting value to be adjusted in the second operating mode.

5 Claims, 16 Drawing Sheets

PRIOR ART

PRIOR ART

PRIOR ART

PRIOR ART

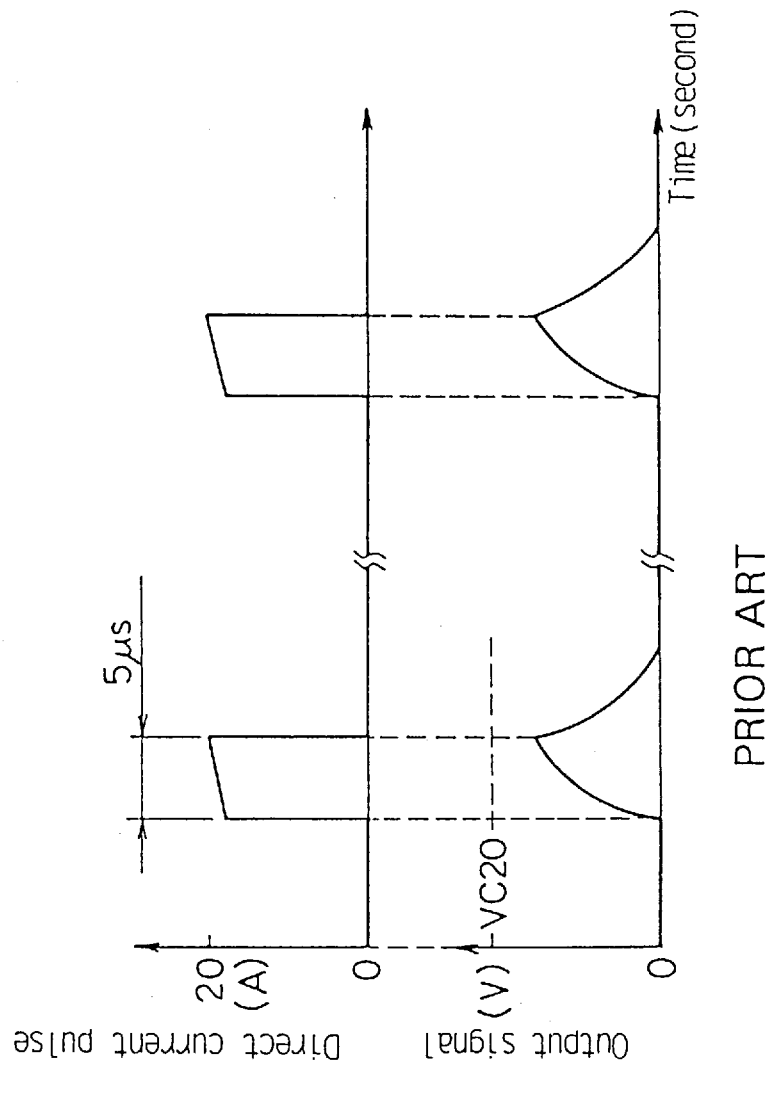

DIRECT CURRENT BRUSHLESS MOTOR AND DRIVING METHOD THEREFOR

BACKGROUND OF THE INVENTION

The present invention relates to a sensorless type direct current brushless motor and a driving method therefor.

In recent years, in accordance with world-wide demands for energy saving, it is required to reduce power consumption in various electric apparatuses as a matter of course. Particularly, in a driving motor for a compressor of an air conditioner, an induction motor is mainly used therefor. However, according to the above-mentioned demands, a D.C. (direct current) brushless motor, in which a permanent magnet is equipped for a rotor, has been mainly used instead of the induction motor as the driving motor. The reason why is that the D.C. brushless motor has a superior efficiency to the induction motor.

Meanwhile, in the driving motor, the driving motor is put in a severe atmosphere of high-temperature and high-pressure caused by a coolant, and is polluted by a lubricant oil inside of the compressor. Therefore, it is difficult that a position sensor such as a Hall element or a rotary encoder is mounted on the D.C. brushless motor. Accordingly, a sensorless type D.C. brushless motor is used for the driving motor.

In the sensorless type D.C. brushless motor, a rotational position is generally detected by finding variation of an induced voltage appearing on a stator winding of the motor, so that commutation of current to be supplied with the stator winding is controlled.

However, in the sensorless type D.C. brushless motor, there is no appearance of the induced voltage at a starting of the motor because the rotor is stopped. Therefore, in the starting of the sensorless type D.C. brushless motor, it is impossible to detect the rotational position until an adequate induced voltage appears on the stator winding.

Therefore, it is known that the sensorless type D.C. brushless motor is driven by the following two operating modes (1) and (2):

(1) A first operating mode (a starting operation)

In the first operating mode, the sensorless type D.C. brushless motor is driven so that a commutating frequency and an applied voltage of the motor are increased gradually in no relation to the induced voltage. Hereafter, when a rotational speed of the motor reaches to a predetermined value, the operating mode is switched from the first operating mode to the second operating mode.

(2) A second operating mode (an ordinary operation)

In the second operating mode, the sensorless type D.C. brushless motor is driven by a feedback control in accordance with the induced voltage.

A conventional sensorless type D.C. brushless motor will be explained with reference to FIG. 5 concretely.

FIG. 5 is a block diagram showing a conventional sensorless type D.C. brushless motor. In FIG. 5, points B, C, E, and F are connected to points B', C', E', and F', respectively.

In FIG. 5, a conventional sensorless type D.C. brushless motor 31 comprises a rotor 32 having a permanent magnet and a stator winding 33 to be made in interlinkage with a magnetic flux of a magnetic field generated from the permanent magnet of the rotor 32. The stator winding 33 consists of three coils 33a, 33b, and 33c defined as U-phase, V-phase, and W-phase, respectively. The three coils 33a, 33b, and 33c are connected into three-phase star connection. The three coils 33a, 33b, and 33c are connected to a direct current power supply 34 through a semiconductor commutator device 35, so that the three coils 33a, 33b, and 33c are given with current each having phase difference of 120° therebetween. When the current is given to the three coils 33a, 33b, and 33c, the rotor 32 is rotated by magnetic interaction of its magnetic flux with the magnetic field generated by currents in the three coils 33a, 33b, and 33c.

The semiconductor commutator device 35 has six switching elements, for example, six transistors 35a, . . . , 35f and three AND gates 36a, 36b, 36c.

The six transistors 35a, . . . , 35f are connected into three-phase bridge connection in the semiconductor commutator device 35. The collectors of the transistors 35a, 35b, and 35c are connected to a positive electrode of the direct current power supply 34, and the emitters of the transistors 35d, 35e, and 35f are connected to a negative electrode of the direct current power supply 34. Furthermore, the emitter of the transistor 35a and the collector of the transistor 35d are connected to one end of the coil 33a. Similarly, the emitter of the transistor 35b and the collector of the transistor 35e are connected to one end of the coil 33b, and also, the emitter of the transistor 35c and the collector of the transistor 35f are connected to one end of the coil 33c. The bases of the transistors 35a, 35b, 35c are connected to the below-mentioned control unit 38 through the respective three AND gates 36a, 36b, 36c, and the bases of the transistors 35d, 35e, 35f are connected to the control unit 38. In order to protect the six transistors 35a, . . . , 35f, six protective diodes (not shown) are connected between the respective emitters and the respective collectors of the six transistors 35a, . . . , 35f.

In the semiconductor commutator device 35, switching states of the six transistors 35a, . . . , 35f are controlled by the control unit 38. Thereby, a direct current voltage is modulated to a voltage in accordance with pulse width modulation, and the voltage is applied to both ends of the respective three coils 33a, 33b, and 33c as the applied voltage.

Explanation will be given on a conventional control mechanism.

The conventional control mechanism comprises a position detecting block 37 for detecting the rotational position of the rotor 32, the control unit 38 for controlling the commutation and a duty ratio of the applied voltage.

The position detecting block 37 detects a positional phase corresponding to the rotational position of the rotor 32 in every phases of the three-phase, and issues a positional signal to the control unit 38.

The control unit 38 consists of a microcomputer, and controls the commutation and the duty ratio in accordance with the above-mentioned two operating modes. The control unit 38 has a rotational speed detecting block 39 connected to the position detecting block 37 so as to receive output of the latter, an operating mode switching block 40 connected to the rotational speed detecting block 39 so as to receive output of the latter, and first and second switching blocks 41a and 41b to be controlled by the operating mode switching block 40. Furthermore, the control unit 38 has a starting operation control block 42 connected to the first and second switching blocks 41a and 41b so as to give output to the latters, a commutation control block 43 connected to the first switching block 41a, and a duty ratio control block 44 connected to the second switching block 41b.

The rotational speed detecting block 39 detects a rotational speed of the motor 31 in accordance with the positional signal issued from the position detecting block 37. The operating mode switching block 40 switches over the first and second operating modes based upon the rotational speed detected by the rotational speed detecting block 39.

Concretely, when the rotational speed reaches to a predetermined value, the operating mode switching block 40 issues a switching signal to the first and second switching blocks 41a and 41b. Thereby, the operating mode of the motor 31 is switched from the first operating mode to the second operating mode.

The starting operation control block 42 stores a starting pattern, namely, pre-directed information about the commutating frequency and the duty ratio in the first operating mode. In the case that the motor 31 is driven by the first operating mode, the starting operation control block 42 issues the pre-directed information about the commutating frequency to the commutation control block 43 through the first switching block 41a as a first demand signal. At the same time, the starting operation control block 42 issues the pre-directed information about the duty ratio to the duty ratio control block 44 through the second switching block 41b as a second demand signal.

The commutation control block 43 issues six first control signals to the bases of the transistors 35d, 35e, 35f and the three AND gates 36a, 36b, 36c, respectively, so that a commutation control is performed. In the case that the motor 31 is driven by the first operating mode, the commutation control block 43 forms and issues the six first control signals in accordance with the first demand signal issued from the starting operation control block 42. In the case that the motor 31 is driven by the second operating mode, the commutation control block 43 is connected to the position detecting block 37 through the first switching block 41a. Thereby, the commutation control block 43 inputs the positional signal from the position detecting block 37, and forms and issues the six first control signals in accordance with the positional signal.

The duty ratio control block 44 has a timer 45 for issuing three second control signals to the three AND gates 36a, 36b, 36c, respectively, so that a duty ratio control is performed. The timer 45 is operated by a predetermined clock, and forms and issues the three second control signals in accordance with the duty ratio to be adjusted by a register (not shown). In the case that the motor 31 is driven by the first operating mode, the duty ratio control block 44 inputs the second demand signal issued from the starting operation control block 42, and the duty ratio is adjusted to the timer 45 in accordance with the second demand signal issued from the starting operation control block 42. In the case that the motor 31 is driven by the second operating mode, the duty ratio control block 44 is connected to the rotational speed detecting block 39 through the second switching block 41b. Thereby, the duty ratio control block 44 inputs the rotational speed from the rotational speed detecting block 39. Furthermore, in the second operating mode, the duty ratio control block 44 also inputs a commanded rotational speed. The duty ratio is adjusted to the timer 45 in accordance with comparison result of the rotational speed and the commanded rotational speed.

Each of the three AND gates 36a, 36b, 36c produces a logical product both the first and second control signals, and outputs the resultant signal to each base of the transistors 35a, 35b, 35c.

Furthermore, in the conventional control mechanism, a current sensor 46 is provided between the direct current power supply 34 and the semiconductor commutation device 35, and an overcurrent protection block 47 is connected to the current sensor 46. The current sensor 46 consists of a current transformer having a shunt resistance or the Hall element, and detects a direct current pulse to be supplied to the semiconductor commutator device 35. In order to avoid mis-detections caused by noise and recovery current flowing in the protective diodes, the current sensor 46 has a time constant in a range between several $\mu S$ (micro-second) and several ten $\mu S$.

The overcurrent protection block 47 is constituted with a comparator circuit or a photocoupler circuit, and is used to protect demagnetization of the permanent magnet and to avoid overcurrent for the transistors 35a, . . . , 35f. When a value of the direct current pulse exceeds a threshold value, the overcurrent protection block 47 issues a stop signal to the commutation control block 43. Thereby, the commutation control block 43 controls the six transistors 35a, . . . , 35f to change to the "OFF" state, so that supply of the current is stopped.

Driving method of the conventional sensorless type D.C. brushless motor 31 will be explained.

As has been explained in the above, in the starting of the motor 31, the rotor 32 is stopped, and thereby, there is no appearance of the induced voltage. Therefore, the motor 31 is driven and controlled by the first operating mode. That is, the commutation control block 43 controls the commutation in accordance with the first demand signal issued from the starting operation control block 42, and the duty ratio control block 44 controls the duty ratio in accordance with the second demand signal issued from the starting operation control block 42.

In order to start the motor 31 ideal (smoothly), it is necessary that the rotational speed is increased so that a torque of the motor 31 becomes a constant value.

Firstly, this ideal starting operation in the motor 31 will be elucidated with reference to FIGS. 6, 7A . . . 7F and 8.

FIG. 6 is a graph showing an example of an ideal starting pattern. FIG. 7A is a waveform chart showing a switching state of the transistor 35a. FIG. 7B is a waveform chart showing a switching state of the transistor 35b. FIG. 7C is a waveform chart showing a switching state of the transistor 35c. FIG. 7D is a waveform chart showing a switching state of the transistor 35d. FIG. 7E is a waveform chart showing a switching state of the transistor 35e. FIG. 7F is a waveform chart showing an switching state of the transistor 35f. FIG. 8 is a partially expanded view showing a portion surrounded by a dashed line in FIG. 7C.

In FIG. 6, the abscissa is graduated with time, and the ordinate is graduated with the commutating frequency or the duty ratio. Furthermore, in the case of driving shown in FIG. 6, the motor 31 is driven by the first operating mode until a time "T0", and the motor 31 is driven by the second operating mode after the time "T0". In FIG. 7A through FIG. 7F and FIG. 8, the abscissa is graduated with time, and the ordinate is graduated with switching state.

In the ideal starting operation, as shown in a solid line 50 of FIG. 6, the duty ratio is gradually increased in a range between a value nearly to zero (%) and 10 (%). Furthermore, as shown in a dashed line 51, the commutating frequency is gradually increased in a range between a value nearly to zero (Hz) and 10 (Hz). Thereby, the rotational speed is increased so that a torque of the motor 31 becomes a constant value.

As shown in FIG. 7A through FIG. 7F, each of the "ON" state of the transistors 35a . . . 35f is repeated by a commutating period "T1", so that the commutation control is performed. The commutating period "T1" is equal to reciprocal of the commutating frequency. Furthermore, in FIG. 7A through FIG. 7C, each of portions shown by plural vertical lines during the "ON" state designates that the switching state is controlled by the duty ratio control. That is, as shown in FIG. 8, in the duty ratio control, the duty ratio is defined by an ON-duty "T2" and an OFF-duty "T3", and the ON-duty "T2" and the OFF-duty "T3" are repeatedly performed with a carrier period "T4". The carrier period is the period of carrier of the PWM modulating the direct current voltage. More concretely, when the duty ratio is adjusted to the timer 45 (FIG. 5), either time lengths of the ON-duty "T2" and the OFF-duty "T3" is adjusted to the timer 45 since the carrier period "T4" is a constant value. In the timer 45, resolution of the duty ratio is determined by the clock.

However, in a real starting operation in the motor 31, it is impossible that the duty ratio is gradually increased as shown by the solid line 50 of FIG. 6. The reason why is that the duty ratio is adjusted to the timer 45 (FIG. 5) by a discrete value.

The real starting operation by the first operating mode in the motor 31 will be elucidated with reference to FIGS. 9, 10, 11, 12A, and 12B.

FIG. 9 is a graph showing a duty ratio control pattern in the conventional sensorless type D.C. brushless motor. FIG. 10 is a waveform chart showing a peak value of a current flowing in the stator winding 33 of the conventional sensorless type D.C. brushless motor. FIG. 11 is a waveform chart showing a voltage appearing on a coil 33a of the conventional sensorless type D.C. brushless motor when a negative electrode of a direct current power supply 34 is a reference voltage in the first operating mode. FIG. 12A is a waveform chart showing a current to be detected by a current sensor 46 of the conventional sensorless type D.C. brushless motor. FIG. 12B is a waveform chart showing an output signal from the current sensor 46 of the conventional sensorless type D.C. brushless motor.

In FIG. 9, the abscissa is graduated with time, and the ordinate is graduated with the duty ratio. In FIG. 10, the abscissa is graduated with time, and the ordinate is graduated with current. Furthermore, in the case of driving shown in FIGS. 9 and 10, the motor 31 is driven by the first operating mode until a time "T0", and the motor 31 is driven by the second operating mode after the time "T0". In FIG. 11, the abscissa is graduated with time, and the ordinate is graduated with voltage. In FIG. 12A, the abscissa is graduated with time, and the ordinate is graduated with current. In FIG. 12B, the abscissa is graduated with time, and the ordinate is graduated with voltage. FIGS. 12A and 12B are drawn with their timing positions (represented by vertical broken lines) in agreement with each other.

As shown in FIG. 9, the duty ratio is adjusted to the timer 45 (FIG. 5) in a step-shaped. As a result, as shown in FIG. 10, a peak value of the current flowing in the stator winding 33 (FIG. 5) is changed according to increase of the duty ratio, and thereby, a ripple appears on the waveform of the peak value of the current. In FIG. 10, the threshold value adjusted in the overcurrent protection block 47 (FIG. 5) is represented by horizontal broken lines.

Furthermore, as shown in FIG. 11, the phase of the applied voltage for the coil 33a (FIG. 5) lags from the rotational phase obtained by the induced voltage. The reason why is that, when the motor 31 (FIG. 5) is driven by the first operating mode, the applied voltage is given to the stator winding 33 (FIG. 5) in no relation to the induced voltage.

Furthermore, in this starting operation, the current flowing in the stator winding 33 becomes large because influence of a counter-electromotive force caused by the induced voltage is small. For example, in the case that the time length of the ON-duty is adjusted to 10 $\mu$S, the current sensor 46 (FIG. 5) detects the direct current pulse having a waveform shown in FIG. 12A. As has been explained in the above, since the current sensor 46 has the time constant, the current sensor 46 issues an output signal having a waveform shown in FIG. 12B to the overcurrent protection block 47 (FIG. 5). In FIG. 12B, when the current sensor 47 detects the current of 20 amperes, a value of the output signal reaches to a value "VC20" finally.

Explanation will be given on the second operating mode.

As has been explained in the above, when the rotational speed reaches to the predetermined value, the operating mode switching block 40 (FIG. 5) issues the switching signal to the first and second switching blocks 41a and 41b (FIG. 5). Thereby, the commutation control block 43 (FIG. 5) receives the positional signal from the position detecting block 37 (FIG. 5), and the duty ratio control block 44 (FIG. 5) receives the rotational speed from the rotational speed detecting block 39 (FIG. 5). Thus, the operating mode of the motor 31 is switched from the first operating mode to the second operating mode.

In the second operating mode, the commutation is controlled so that the current starts to flow in the stator winding 33 when a value of the induced voltage approximates to a maximum value. Thereby, the influence of the counter-electromotive force becomes large, and the current flowing in the stator winding 33 becomes small. Furthermore, the efficiency of the motor 31 is increased in comparison with that of the first operating mode.

For example, a waveform of the voltage appearing on the coil 33a will be elucidated with reference to FIG. 13 concretely.

FIG. 13 is a schematic waveform chart showing a voltage appearing on the coil 33a of the conventional sensorless type D.C. brushless motor 31 when the negative electrode of the direct current power supply 34 is the reference voltage in the second operating mode. In FIG. 13, the abscissa is graduated with time, and the ordinate is graduated with voltage.

As shown in FIG. 13, the commutation for the coil 33a is controlled so that the current starts to flow in the coil 33a when a value of the induced voltage approximates to the maximum value. In other words, the phase of the applied voltage for the coil 33a is controlled in accordance with the rotational phase obtained by the induced voltage.

A waveform of a voltage appearing on the coil 33b lags from the waveform of the voltage appearing on the coil 33a with 120°. A waveform of a voltage appearing on the coil 33c lags from the waveform of the voltage appearing on the coil 33a with 240°.

In the duty ratio control, the duty ratio control block 44 compares the real rotational speed with the commanded rotational speed. In the case that the commanded rotational speed is larger than the real rotational speed, the duty ratio (ON-duty) is increased. In the case that the commanded rotational speed is smaller than the real rotational speed, the duty ratio (ON-duty) is decreased. By this duty ratio control, the motor 31 rotates at the commanded rotational speed.

In the conventional sensorless type D.C. brushless motor 31, the above-mentioned carrier period is adjusted to a constant value regardless of the first or second operating modes. For example, when the motor 31 is used as the driving motor for the compressor of the air conditioner, the carrier period is adjusted to about several hundred $\mu$S. In order to suppress electromagnetic sound noise generated in the carrier period, the compressor is generally covered by a noise isolation cover or the like.

However, in the conventional sensorless type D.C. brushless motor 31, when the carrier period is adjusted to a shorter value, there are various problems in the starting operation.

These problems will be explained with reference to FIGS. 14, 15, 16A, and 16B.

FIG. 14 is a graph showing a duty ratio control pattern in the conventional sensorless type D.C. brushless motor when the carrier period is adjusted to a smaller value. FIG. 15 is a waveform chart showing a peak value of a current flowing in the stator winding 33 of the conventional sensorless type D.C. brushless motor when the carrier period is adjusted to a smaller value. FIG. 16A is a waveform chart showing a current to be detected by a current sensor 46 of the conventional sensorless type D.C. brushless motor when the carrier period is adjusted to a smaller value. FIG. 16B is a waveform chart showing an output signal from the current sensor 46 of the conventional sensorless type D.C. brushless motor when the carrier period is adjusted to a smaller value. In FIG. 14, the abscissa is graduated with time, and the ordinate is graduated with the duty ratio. In FIG. 15, the abscissa is graduated with time, and the ordinate is graduated with current. In FIGS. 14 and 15, the motor 31 is driven by the first operating mode until a time "T0", and the motor 31 is driven by the second operating mode after the time "T0". In FIG. 16A, the abscissa is graduated with time, and the ordinate is graduated with current. In FIG. 16B, the abscissa is graduated with time, and the ordinate is graduated with voltage. FIGS. 16A and 16B are drawn with their timing positions (represented by vertical broken lines) in agreement with each other.

As shown in FIG. 14, when the carrier period is adjusted to a smaller value, the resolution of the duty ratio is deteriorated in comparison with that shown in FIG. 9. In other words, a differential value between two successive values of the duty ratio to be adjusted becomes larger than that of FIG. 9. As a result, the torque of the motor 31 is suddenly and largely changed, so that a large ripple appears on the waveform of the peak value of the current as shown in FIG. 15. Thereby, there is a fear that the overcurrent protection block 47 is often operated by the ripple. As a result, there is a problem that it is impossible to start the motor 31 smoothly.

In order to solve this problem, through improvement of the resolution of the timer 45, it is necessary to use a timer having properties of high-speed and high-performance. Thereby, cost of the motor 31 will be inevitable high.

Furthermore, when the motor 31 is used as the driving motor for the compressor of the air conditioner of a vehicle e.g., an automobile, an electromobile, etc., there is a fear that the motor 31 can not start owing to a differential pressure between a delivery chamber and a suction chamber of the compressor. According to the inventor's experiment, when the differential pressure was more than 2 (kg/cmG), the motor 31 could not start.

Furthermore, when the carrier period is adjusted to a smaller value, as shown in FIG. 16A, width of the direct current pulse becomes small. Thereby, as shown in FIG. 16B, response of the current sensor 46 is deteriorated. Therefore, it is possible that the overcurrent protection block 47 can not operate precisely. That is, when a value of the direct current pulse exceeds the threshold value, the overcurrent protection block 47 fails to issue the stop signal to the communication control block 43. As a result of the overcurrent, it is impossible to protect the demagnetization of the permanent magnet and breakdown of the transistor 35$a$ . . . 35$f$.

In order to solve the above-mentioned problem, in the case that the response of the current sensor 46 is improved, it is necessary to use a current sensor having properties of high-speed and high-performance. Thereby, cost of the motor 31 will become inevitably high.

BRIEF SUMMARY OF THE INVENTION

Briefly stated the present invention comprises a direct current brushless motor including a rotor having a permanent magnet and a stator winding arranged in interlinkage with a magnet field generated by the permanent magnet. A control unit is included for controlling a commutation of current flowing in the stator winding, a duty ratio of an applied voltage to the stator winding, and a carrier period for the duty ratio. The control unit switches between a first operating mode at a starting operation and a second operating mode at an ordinary operation in accordance with at least one of a rotational speed of the rotor and time length from the starting of the first starting mode. The control unit adjusts the carrier period so that a first setting value to be adjusted in the first operating mode is larger than a second setting value to be adjusted in the second operating mode.

BRIEF DESCRIPTION OF THE SEVERAL VIEWS OF THE DRAWING

FIG. 16A is a waveform chart showing a current to be detected by a current sensor 46 of the conventional sensorless type D.C. brushless motor when the carrier period is adjusted to a smaller value.

FIG. 16B is a waveform chart showing an output signal from the current sensor 46 of the conventional sensorless type D.C. brushless motor when the carrier period is adjusted to a smaller value.

DETAILED DESCRIPTION OF THE INVENTION

Hereafter, a preferred embodiment of the present invention is described with reference to the accompanying drawings.

Figure 1:
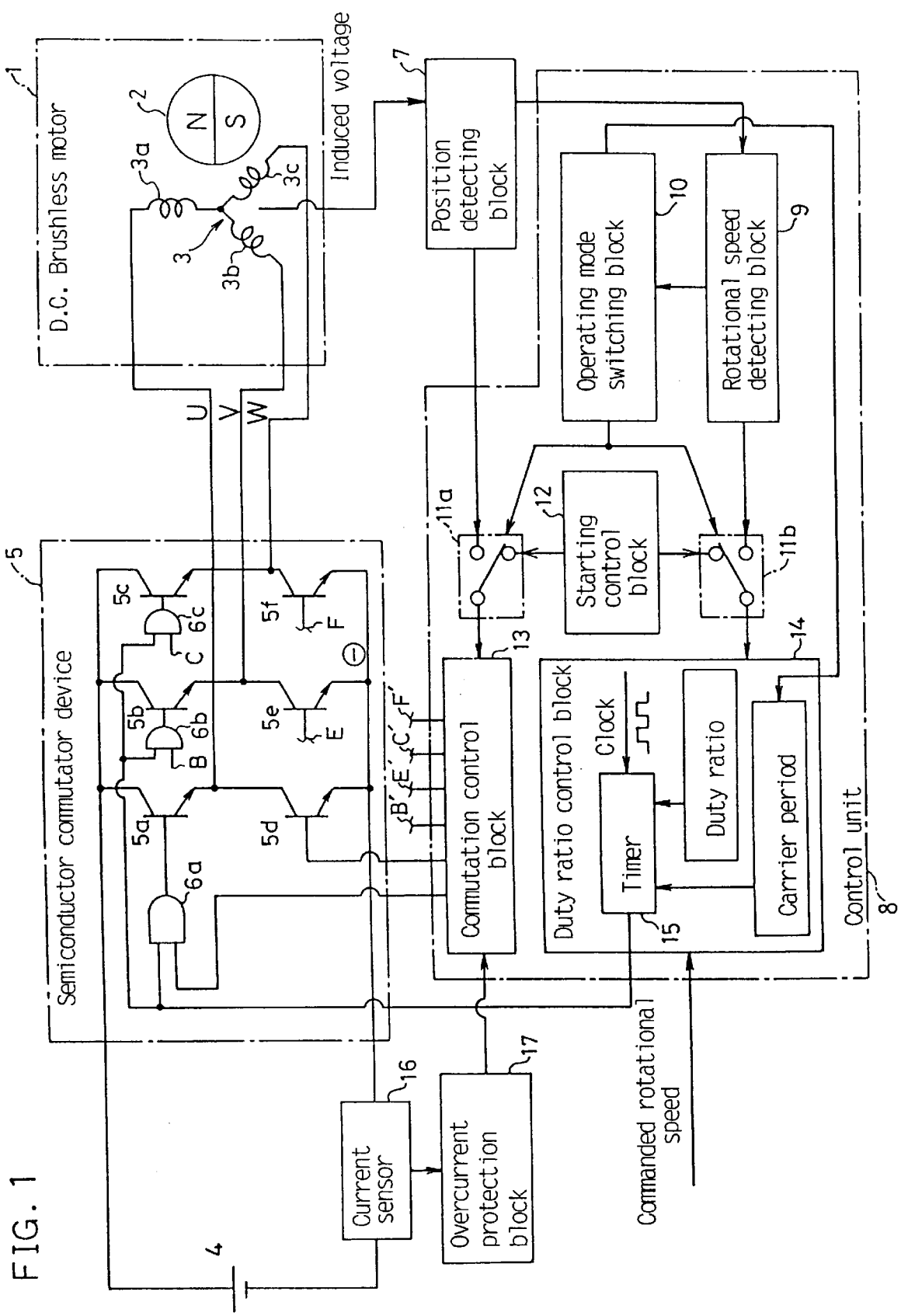
FIG. 1 is a block diagram showing a direct current brushless motor of the present invention.

FIG. 1 is a block diagram showing a direct current brushless motor of the present invention. In FIG. 1, points B, C, E, and F are connected to points B', C', E', and F', respectively. In the present invention, increase of a duty ratio means increase of portion of ON-duty time in one carrier period.

In FIG. 1, a sensorless type D.C. (direct current) brushless motor 1 comprises a rotor 2 having a permanent magnet and a stator winding 3 to be made in interlinkage with a magnetic flux of a magnetic field generated from the permanent magnet of the rotor 2. The stator winding 3 consists of three coils 3a, 3b, and 3c defined as U-phase, V-phase, and W-phase, respectively. The three coils 3a, 3b, and 3c are connected into three-phase star connection. The three coils 3a, 3b, and 3c are connected to a direct current power supply 4 through a semiconductor commutator device 5, so that the three coils 3a, 3b, and 3c are given with current each having phase difference of 120° therebetween. When the current is given to the three coils 3a, 3b, and 3c, the rotor 2 is rotated by magnetic interaction of its magnetic flux with the magnetic field generated by currents in the three coils 3a, 3b, and 3c.

The semiconductor commutator device 5 has six switching elements, for example, six transistors 5a, ..., 5f and three AND gates 6a, 6b, 6c.

The six transistors 5a, ..., 5f are connected into three-phase bridge connection in the semiconductor commutator device 5. The collectors of the transistors 5a, 5b, and 5c are connected to a positive electrode of the direct current power supply 4, and the emitters of the transistors 5d, 5e, and 5f are connected to a negative electrode of the direct current power supply 4. Further, the emitter of the transistor 5a and the collector of the transistor 5d are connected to one end of the coil 3a. Similarly, the emitter of the transistor 5b and the collector of the transistor 5e are connected to one end of the coil 3b, and also, the emitter of the transistor 5c and the collector of the transistor 5f are connected to one end of the coil 3c. The bases of the transistors 5a, 5b, 5c are connected to a control unit 8 through the respective three AND gates 6a, 6b, 6c, and the bases of the transistors 5d, 5e, 5f are connected to the control unit 8. In order to protect the six transistors 5a, ..., 5f, six protective diodes (not shown) are connected between the respective emitters and the respective collectors of the six transistors 5a, ..., 5f.

In the semiconductor commutator device 5, switching states of the six transistors 5a ... 5f are controlled by the control unit 8. Thereby, a direct current voltage is modulated to a voltage in accordance with pulse width modulation, and the voltage is applied to both ends of the respective three coils 3a, 3b, and 3c as the applied voltage.

Explanation will be given on a control mechanism for the motor 1.

The motor 1 is driven by the control mechanism in accordance with a first and a second operating modes.

In the first operating mode (a starting operation), the motor 1 is driven so that a commutating frequency and an applied voltage of the motor are increased gradually regardless of an induced voltage of the stator winding 3. Hereafter, when a rotational speed of the motor reaches to a predetermined value, the operating mode is switched from the first operating mode to the second operation mode.

In the second operating mode (an ordinary operation), the motor 1 is driven by a feedback control in accordance with the induced voltage.

The control mechanism comprises a position detecting block 7 for detecting the rotational position of the rotor 2, and the control unit 8 for controlling a commutation of the current, a duty ratio of the applied voltage, and a carrier period for the duty ratio. The carrier period is the period of carrier of the PWM modulating the direct current voltage.

The position detecting block 7 detects a positional phase corresponding to the rotational position of the rotor 2 in every phases of the three-phase, and issues a positional signal to the control unit 8.

The control unit 8 consists of a microcomputer, and controls the commutation, the duty ratio and the carrier period in accordance with the above-mentioned two operating modes. The control unit 8 has a rotational speed detecting block 9 connected to the position detecting block 7 so as to receive output of the latter, an operating mode switching block 10 connected to the rotational speed detecting block 9 so as to receive output of the latter, and first and second switching blocks 11a and 11b to be controlled by the operating mode switching block 10. Furthermore, the control unit 8 has a starting operation control block 12 connected to the first and second switching blocks 11a and 11b so as to give output to the latters, a commutation control block 13 connected to the first switching block 11a, and a duty ratio control block 14 connected to the second switching block 11b.

The rotational speed detecting block 9 determine a rotational speed of the motor 1 in accordance with the positional signal issued from the position detecting block 7. The operating mode switching block 10 switches over between the first and second operating modes based upon the rotational speed detected by the rotational speed detecting block 9. More concretely, when the rotational speed reaches to a predetermined value, the operating mode switching block 10 issues a first switching signal to the first and second switching blocks 11a and 11b. At the same time, the operating mode switching block 10 issues a second switching signal to the duty ratio control block 14. Thereby, the operating mode of the motor 1 is switched from the first operating mode to the second operating mode.

Apart from the aforementioned explanation, wherein the operating mode switching block 10 issues the first and second switching signals when the rotational speed reaches to the predetermined value, an alternative construction may be such that the operating mode switching block 10 issues the first and second switching signals when a time length passes to a predetermined time from starting of the first operating mode. Furthermore, the operating mode switching block 10 issues the first and second switching signals based upon the combination of the rotational speed and the time length.

The starting operation control block 12 stores a starting pattern, namely, pre-directed information about the commutating frequency, the duty ratio, and the carrier period in the first operating mode. In the case that the motor 1 is driven by the first operating mode, the starting operation control block 12 issues the pre-directed information about the commutating frequency to the commutation control block 13 through the first switching block 11a as a first demand signal. At the same time, the starting operation control block 12 issues the pre-directed information about the duty ratio and the carrier period to the duty ratio control block 14 through the second switching block 11b as a second demand signal.

The commutation control block 13 issues six first control signals to the bases of the transistors 5d, 5e, 5f and the three AND gates 6a, 6b, 6c, respectively, so that a commutation control is performed. In the case that the motor 1 is driven by the first operating mode, the commutation control block 13 forms and issues the six first control signals in accordance with the first demand signal issued from the starting operation control block 12. In the case that the motor 1 is driven by the second operating mode, the commutation control block 13 is connected to the position detecting block 7 through the first switching block 11a. Thereby, the commutation control block 13 inputs the positional signal from the position detecting block 7, and forms and issues the six first control signals in accordance with the positional signal.

The duty ratio control block 14 has a timer 15 for issuing three second control signals to the three AND gates 6a, 6b, 6c, respectively, so that a duty ratio control is performed. The timer 15 is operated by a clock issued from a clock generation circuit (not shown).

A concrete construction of the timer 15 will be explained with reference to FIG. 2.

Figure 2:
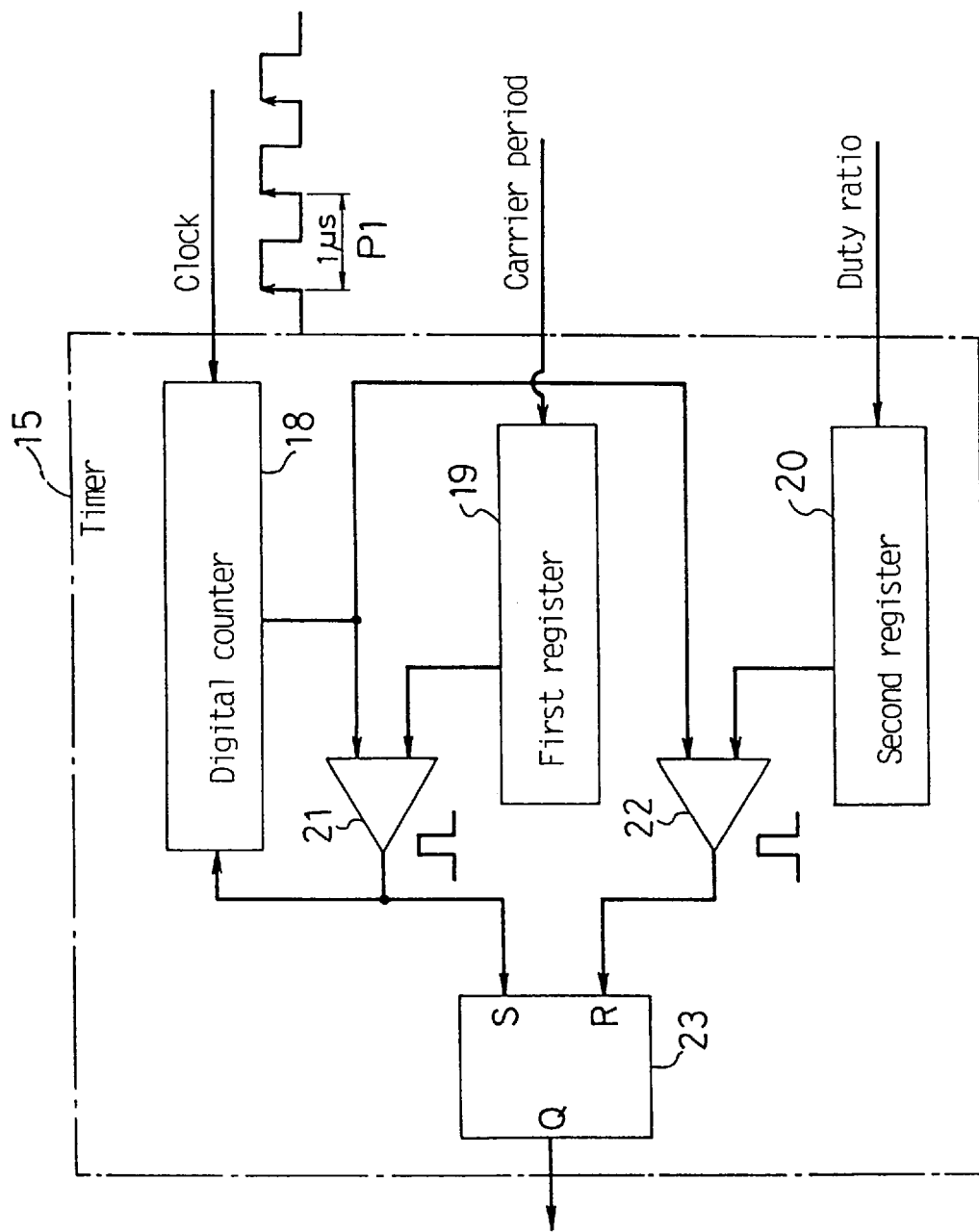
FIG. 2 is a block diagram showing a timer 15 in the D.C. brushless motor of the present invention.

FIG. 2 is a block diagram showing a timer 15 in the D.C. brushless motor of the present invention.

In FIG. 2, the timer 15 comprises a digital counter 18 for counting number of the clock, a first resister 19 for adjusting the carrier period, and a second resister 20 for adjusting a time length of an ON-duty in the duty ratio. Furthermore, the timer 15 has a first comparator 21 for comparing a count value at the digital counter 18 and a setting value of the carrier period in the first resister 19, a second comparator 22 for comparing the count value and a setting value of the ON-duty in the second resister 20, and a flip-flop 23 connected with the first and second comparators 21 and 22.

The digital counter 18 counts the number of the clock in synchronism with input of the clock. For example, in the case that a clock period "P1" is 1 $\mu$S (micro-seconds), the digital counter 18 counts up the number of the clock every 1 $\mu$S.

The first resister 19 receives and holds two setting values of the carrier period upon the two operating modes. That is, when the motor 1 is driven by the first operating mode, a first setting value of the carrier period is adjusted to the first resister 19. When the motor 1 is driven by the second operating mode, the duty ratio control block 14 inputs the second switching signal issued from the operating mode switching block 10. Thereby, a second setting value of the carrier period is adjusted to the first resister 19. These setting values are given by a software and the like. Furthermore, in the motor 1 of the present invention, the first setting value is adjusted no smaller than the second setting value. For example, the first setting value is 100 $\mu$S, and the second setting value is 50 $\mu$S.

The second register 20 receives and holds the time length of the ON-duty to be adjusted responding to the two operating modes. That is, in the case that the motor 1 is driven by the first operating mode, the duty ratio control block 14 inputs the second demand signal issued from the starting operation control block 12, and the time length of the ON-duty is adjusted to the second register 20 in accordance with the second demand signal issued from the starting operation control block 12. In the case that the motor 1 is driven by the second operating mode, the duty ratio control block 14 is connected to the rotational speed detecting block 9 through the second switching block 11b. Thereby, the duty ratio control block 14 inputs the rotational speed from the rotational speed detecting block 9. Furthermore, in the second operating mode, the duty ratio control block 14 also inputs a commanded rotational speed. The time length of the ON-duty is adjusted to the second register 20 in accordance with comparison result of the rotational speed and the commanded rotational speed. More concretely, for example, in the case that the carrier period is adjusted to 100 $\mu$S, 10 $\mu$S is adjusted in the second register 20 as the time length of the ON-duty, so that the duty ratio is adjusted to 10 (%) in the timer 15. Furthermore, resolution of the duty ratio is determined by the clock period and the carrier period. For example, in the case that the clock period and the carrier period are 1 $\mu$S and 50 $\mu$S, respectively, the resolution of the duty ratio is 2 (%=1/50×100).

Apart from the aforementioned explanation, wherein the time length of the ON-duty is adjusted to the second register 20, an alternative construction may be such that a time length of an OFF-duty is adjusted to the second register 20, so that the duty ratio is adjusted in the timer 15.

The first comparator 21 is connected to a set-terminal S of the flip-flop 23, and the second comparator 22 is connected to a reset-terminal R of the flip-flop 23.

In the case that the count value at the digital counter 18 is equal to the setting value of the carrier period in the first resister 19, the first comparator 21 issues a set signal to the set-terminal S of the flip-flop 23, so that output issued from an output terminal Q of the flip-flop 23 (i.e. the second control signals) is in "ON" state. Furthermore, the first comparator 21 issues a clear signal to the digital counter 18, so that the count value is reset.

In the case that the count value at the digital counter 18 is equal to the setting value of the ON-duty in the second resister 20, the second comparator 22 issues a re signal to the reset-terminal R of the flip-flop 23, so that output issued from the output terminal Q of the flip-flop 23 is in "OFF" state.

As a result, each of the three AND gates 6a, 6b, 6c produces a logical product both the first and second control signals, and outputs the resultant signal to the bases of the transistors 5a, 5b, 5c. Thereby, the duty ratio is controlled.

Apart from the aforementioned explanation, wherein the control unit 8 consists of a microcomputer, an alternative construction may be such that the position detecting block 7 and the control unit 8 consists of a microcomputer integrally.

Furthermore, in the control mechanism, a current sensor 16 is provided between the direct current power supply 4 and the semiconductor commutation device 5, and an overcurrent protection block 17 is connected to the current sensor 16. The current sensor 16 consists of a current transformer having a shunt resistance or the Hall element, and detects a direct current pulse to be supplied to the semiconductor commutator device 5. In order to avoid mis-detections caused by noise and recovery current flowing in the protective diodes, the current sensor 16 has a time constant in a range between several $\mu$S and several ten $\mu$S.

The overcurrent protection block 17 is constituted with a comparator circuit or a photocoupler circuit, and is used to protect demagnetization of the permanent magnet and to avoid overcurrent for the transistors 5a, . . . , 5f. When a value of the direct current pulse exceeds a threshold value, the overcurrent protection block 17 issues a stop signal to the commutation control block 13. Thereby, the commutation control block 13 controls the six transistors 5a, . . . , 5f to change to the "OFF" state, so that supply of the current is stopped.

Driving method of the sensorless type D.C. brushless motor 1 will be explained with reference to FIGS. 3, 4A, and 4B.

Figure 3:
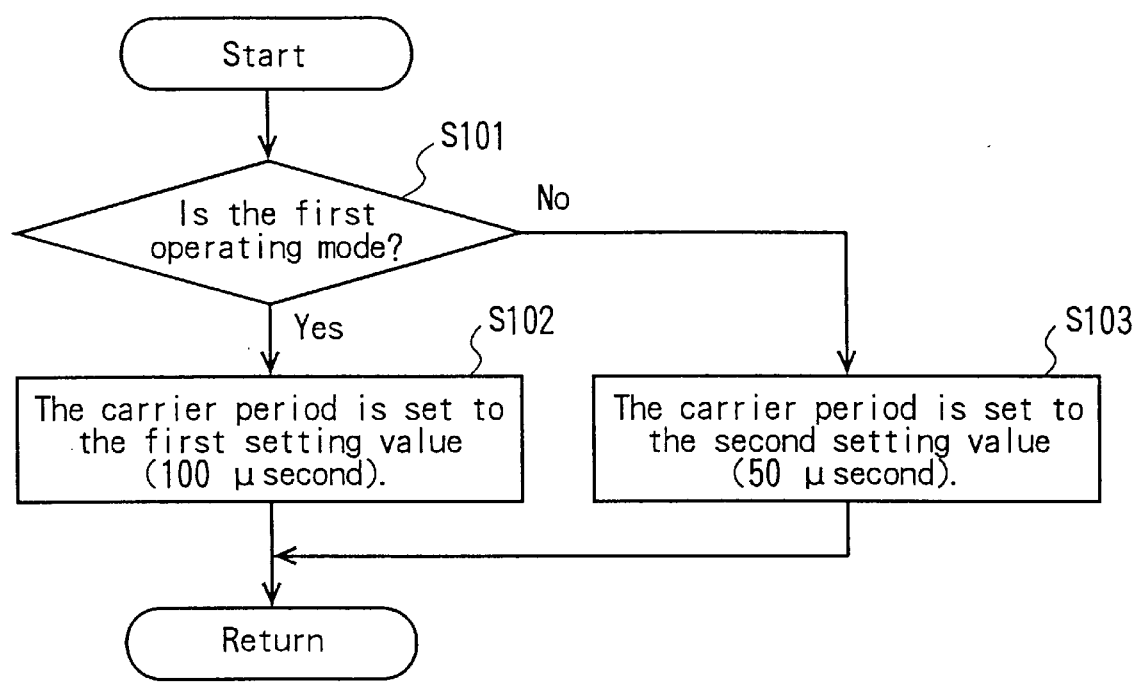
FIG. 3 is a flowchart diagram showing a driving method in the D.C. brushless motor of the present invention.
Figure 4A:
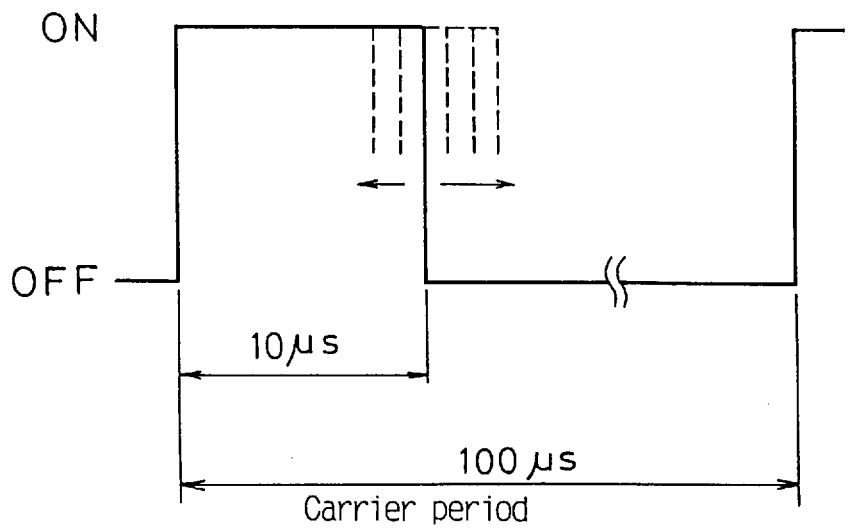
FIG. 4A is a graph showing resolution of a duty ratio when the D.C. brushless motor of the present invention is driven by a first operating mode.
Figure 4B:
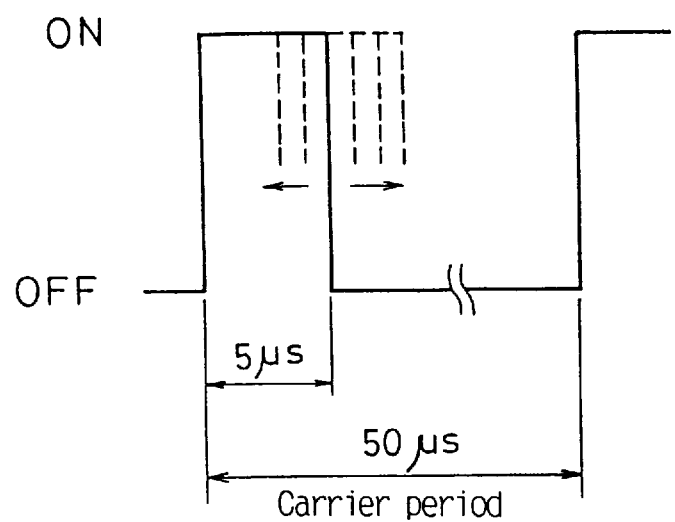
FIG. 4B is a graph showing the resolution of the duty ratio when the D.C. brushless motor of the present invention is driven by a second operating mode.
Figure 5:
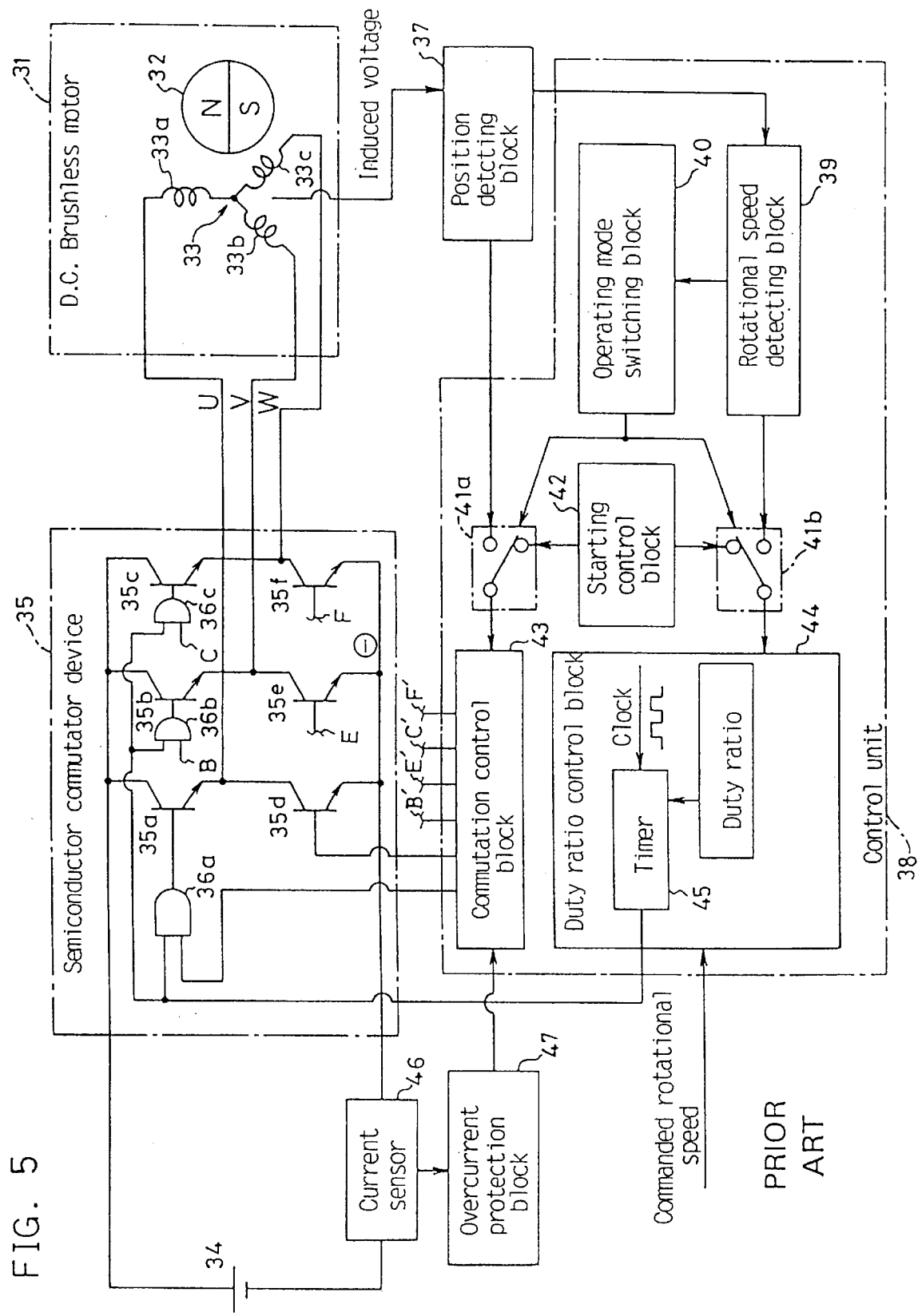
FIG. 5 is a block diagram showing a conventional sensorless type D.C. brushless motor.
Figure 6:
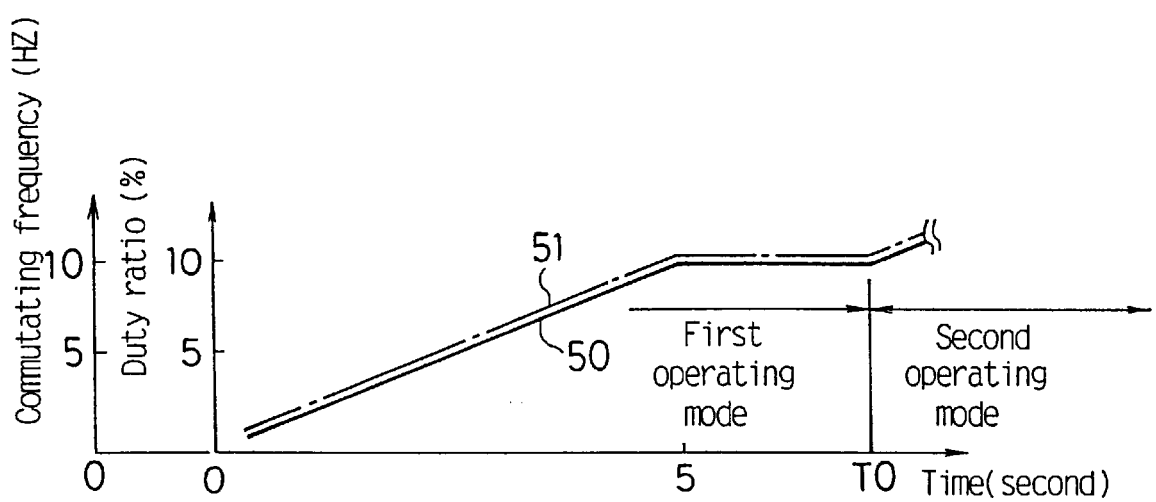
FIG. 6 is a graph showing an example of an ideal starting pattern.
Figure 7:
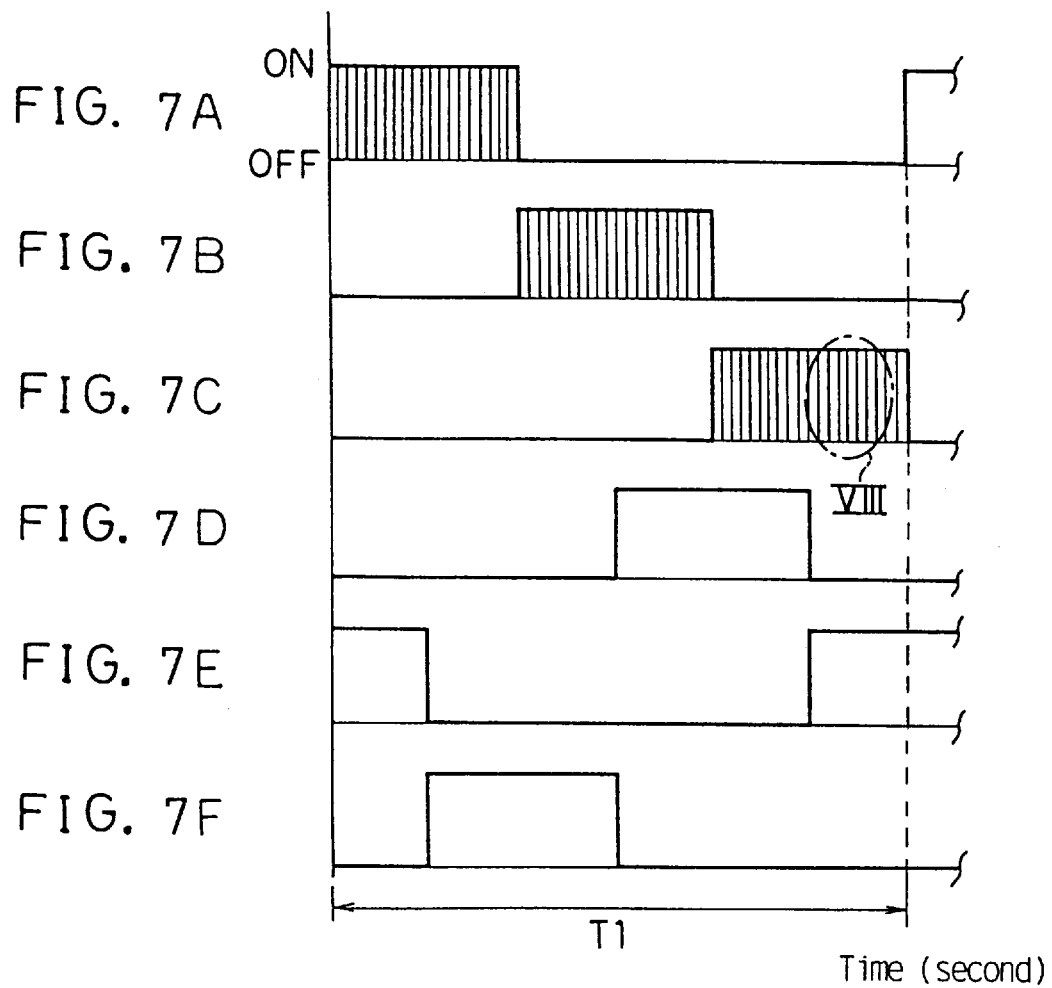
FIG. 7A is a waveform chart showing a switching state of the transistor 35$a$.
FIG. 7B is a waveform chart showing a switching state of the transistor 35$b$.
FIG. 7C is a waveform chart showing a switching state of the transistor 35$c$.
FIG. 7D is a waveform chart showing a switching state of the transistor 35$d$.
FIG. 7E is a waveform chart showing a switching state of the transistor 35$e$.
FIG. 7F is a waveform chart showing an switching state of the transistor 35$f$.
Figure 8:
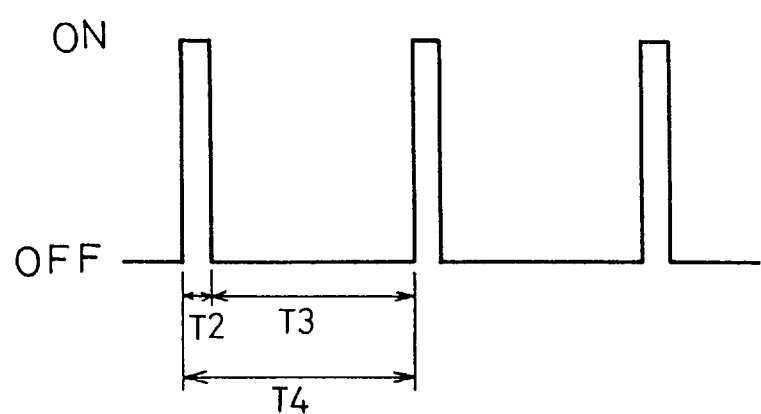
FIG. 8 is a partially expanded view showing a portion surrounded by a dashed line in FIG. 7C.
Figure 9:
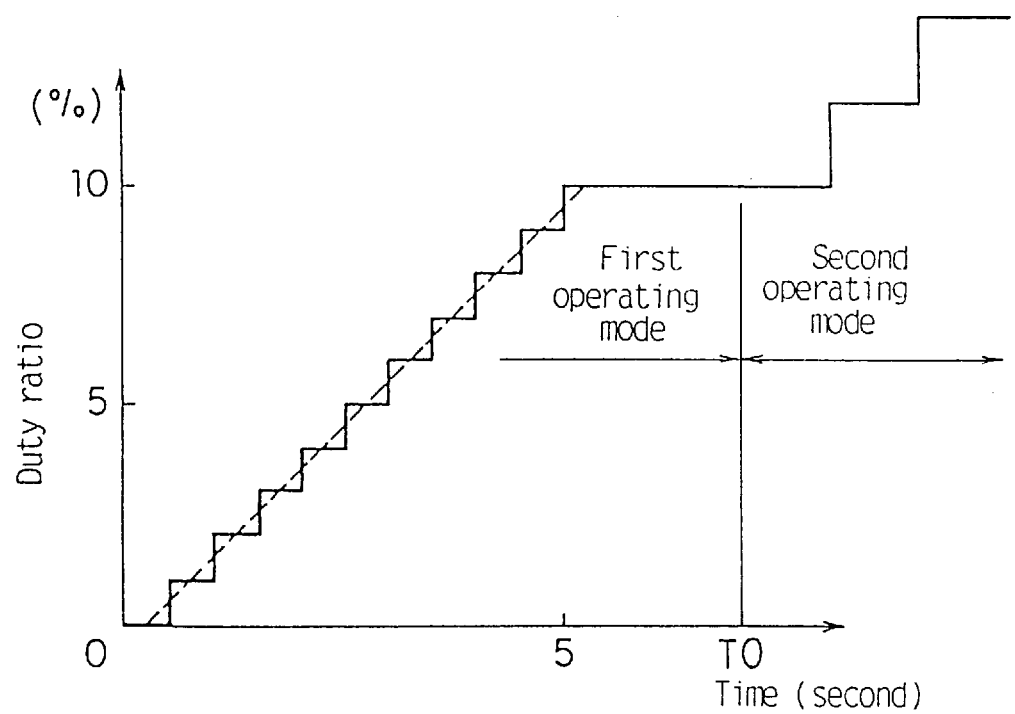
FIG. 9 is a graph showing a duty ratio control pattern in the conventional sensorless type D.C. brushless motor.
Figure 10:
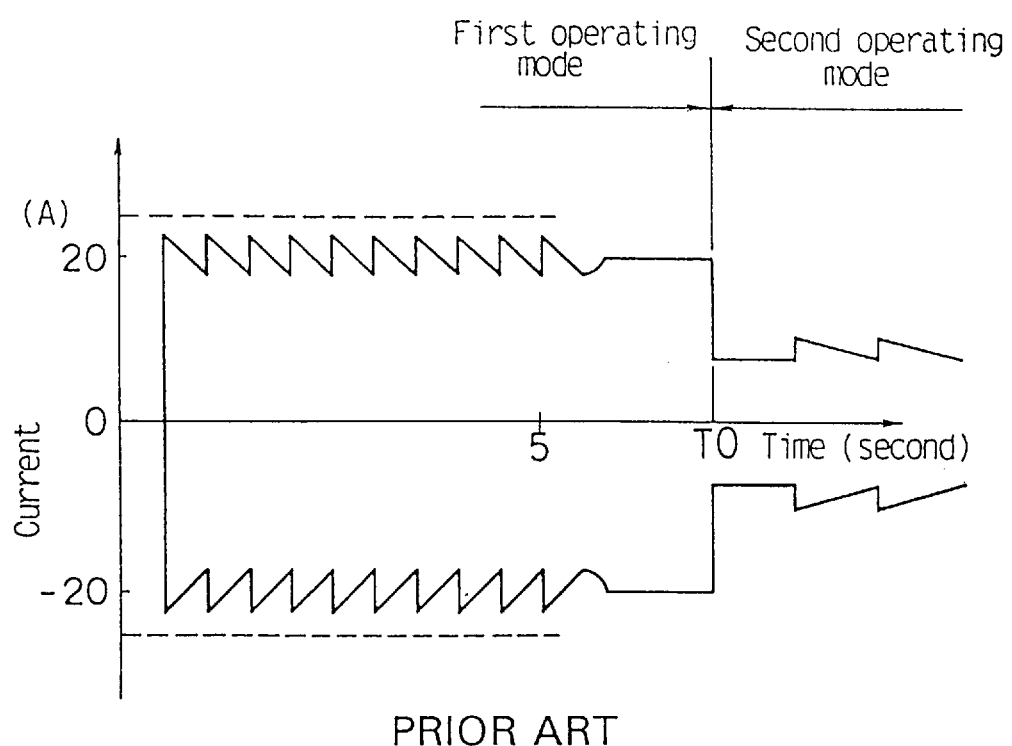
FIG. 10 is a waveform chart showing a peak value of a current flowing in the stator winding 33 of the conventional sensorless type D.C. brushless motor.
Figure 11:
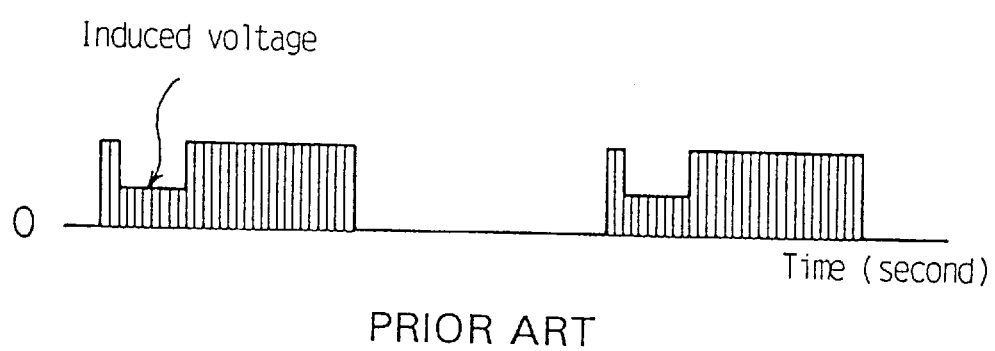
FIG. 11 is a waveform chart showing a voltage appearing on a coil 33$a$ of the conventional sensorless type D.C. brushless motor when a negative electrode of a direct current power supply 34 is a reference voltage in the first operating mode.
Figures 12A, 12B:
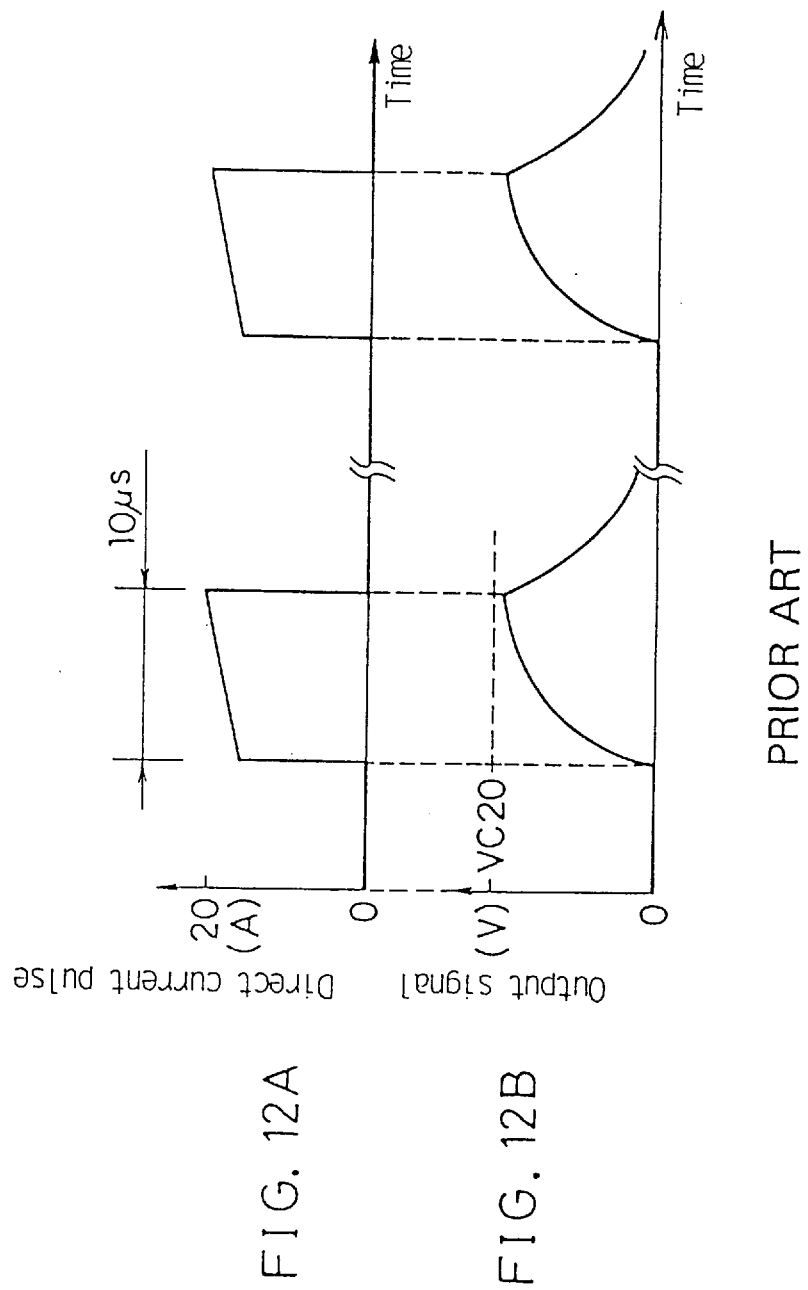
FIG. 12A is a waveform chart showing a current to be detected by a current sensor 46 of the conventional sensorless type D.C. brushless motor.
FIG. 12B is a waveform chart showing an output signal from the current sensor 46 of the conventional sensorless type D.C. brushless motor.
Figure 13:
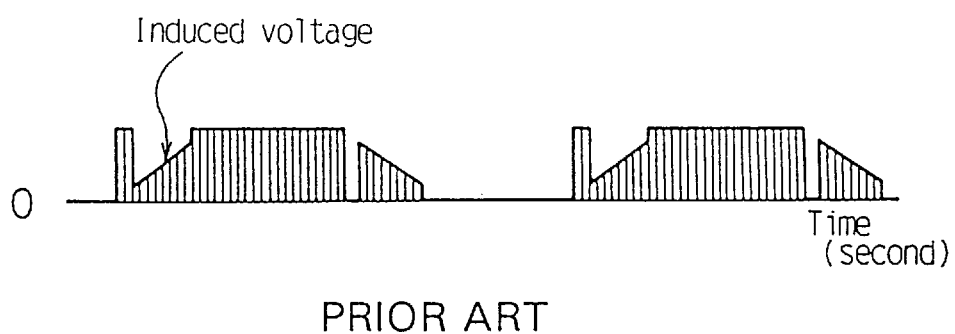
FIG. 13 is a schematic waveform chart showing a voltage appearing on the coil 33$a$ of the conventional sensorless type D.C. brushless motor 31 when the negative electrode of the direct current power supply 34 is the reference voltage in the second operating mode.
Figure 14:
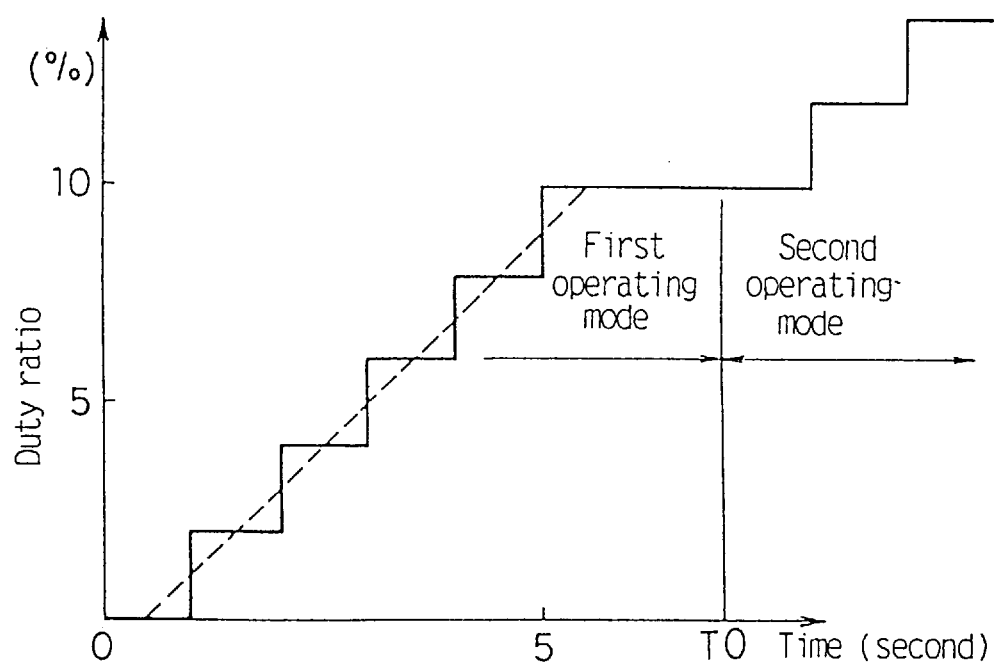
FIG. 14 is a graph showing a duty ratio control pattern in the conventional sensorless type D.C. brushless motor when the carrier period is adjusted to a smaller value.
Figure 15:
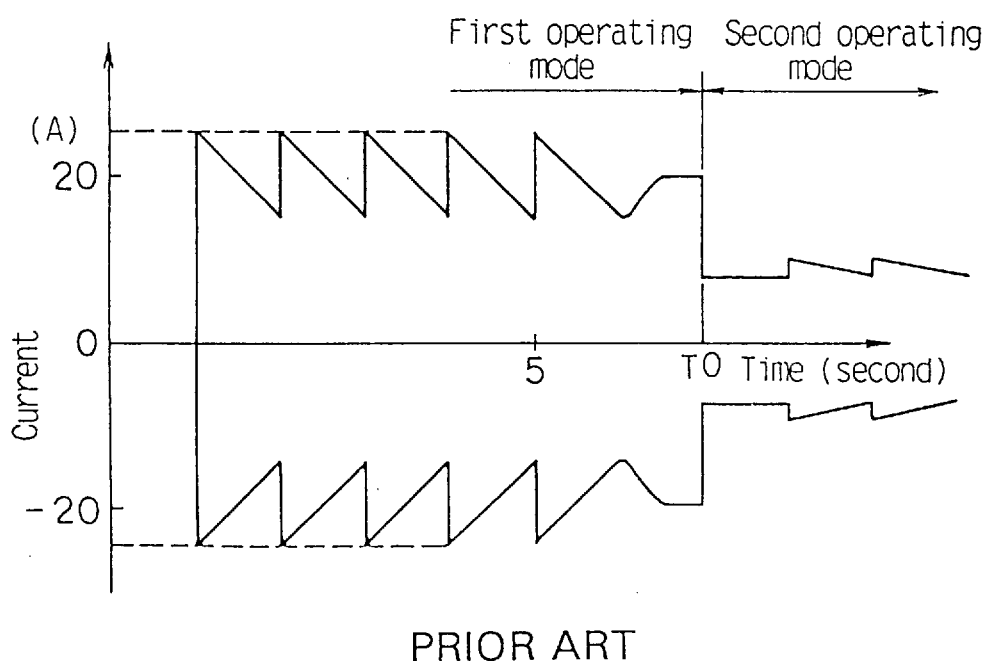
FIG. 15 is a waveform chart showing a peak value of a current flowing in the stator winding 33 of the conventional sensorless type D.C. brushless motor when the carrier period is adjusted to a smaller value.

FIG. 3 is a flowchart diagram showing a driving method in the D.C. brushless motor of the present invention. FIG. 4A is a graph showing resolution of a duty ratio when the D.C. brushless motor of the present invention is driven by a first operating mode. FIG. 4B is a graph showing the resolution of the duty ratio when the D.C. brushless motor of the present invention is driven by a second operating mode. In FIGS. 4A and 4B, the abscissa is graduated with time, and the ordinate is graduated with voltage.

As shown in a step S101, the operating mode switching block 10 (FIG. 1) judges whether the operating mode is the first operating mode.

In the case that the operating mode is the first operating mode, the starting operation control block 12 is connected to the commutation control block 13 (FIG. 1) and the duty ratio control block 14 (FIG. 1). The commutation control block 13 inputs the first demand signal from the starting operation control block 12, and outputs the six first control signals to the semiconductor commutation device 5 (FIG. 1) in accordance with the first demand signal. Thereby, the commutation is controlled.

The duty ratio control block 14 inputs the second demand signal from the starting operation control block 12, and outputs the three second control signals to the semiconductor commutation device 5 in accordance with the second demand signal. Concretely, as shown in a step S102, in the first register 19 (FIG. 2), the carrier period is adjusted to the first setting value (100 $\mu$S). In the second register 20 (FIG. 2), for example, 10 $\mu$S is adjusted as the time length of the ON-duty. Thereby, as shown in FIG. 4A, the duty ratio can be controlled with the resolution of 1 (%) (represented by a plurality of vertical broken lines). As a result, it is possible to suppress a ripple of a peak value of the current flowing in the stator winding 3 (FIG. 1). Thereby, the motor 1 can smoothly start eliminating undue stop which might be caused by operation of the overcurrent protection block 17 (FIG. 1).

Furthermore, according to the inventor's experiment, even if the motor 1 was used as a driving motor for a compressor of an air conditioner, the motor 1 could start smoothly. Concretely, when a differential pressure between a delivery chamber and a suction chamber of the compressor was about 4 (kg/cmG), it was confirmed that the motor 1 started without stop. Moreover, even in the case that the motor 1 was driven by a direct current power source, in which output voltage is changed largely by vibration of load and used in an electromobile and the like, it was confirmed that performance of the starting operation was improved in the motor 1.

Furthermore, it is possible that the time length of the ON-duty is adjusted to a larger value compared with that of the prior art. Thereby, it is possible that the overcurrent protection block 17 (FIG. 1) operates precisely without influence of response of the current sensor 16 (FIG. 1).

In the case that the operating mode is not the first operating mode, that is, the operating mode is the second operating mode, the operating mode switching block 10 issues the first switching signal to the first and second switching blocks 11a and 11b. Furthermore, the operating mode switching block 10 issues the second switching signal to the duty ratio control block 14. Thereby, the commutation control block 13 is connected to the position detecting block 7 (FIG. 1), and the duty ratio control block 14 is connected to the rotational speed detecting block 9 (FIG. 1).

The commutation control block 13 inputs the positional signal from the position detecting block 7, and outputs the six first control signals to the semiconductor commutation device 5 in accordance with the positional signal. Thereby, the commutation of the motor driving current is controlled.

The duty ratio control block 14 inputs the commanded rotational speed and the real rotational speed from the rotational speed detecting block 9. The duty ratio control block 14 outputs the three second control signals to the semiconductor commutation device 5 in accordance with comparison result of the commanded rotational speed and the real rotational speed. Concretely, as shown in a step S103, in the first register 19, the carrier period is adjusted to the second setting value (50 $\mu$S). In the second register 20, for example, 5 $\mu$S is adjusted as the time length of the ON-duty. Thereby, as shown in FIG. 4B, the duty ratio can be controlled with the resolution of 2 (%) (represented by a plurality of vertical broken lines).

In the case that the commanded rotational speed is larger than the real rotational speed, the duty ratio (ratio of ON-duty) is increased. In the case that the commanded rotational speed is smaller than the real rotational speed, the duty ratio (ratio of ON-duty) is decreased. By this duty ratio control, the motor 1 rotates at the commanded rotational speed.

Furthermore, in the second operating mode, since the carrier period is adjusted to 50 $\mu$S, a carrier frequency is adjusted to 20 (kHZ), which is nearly equal to limitation of audio range. As a result, it is possible to extinguish electromagnetic sound noise caused by the carrier frequency.

In the second operating mode, influence of the counter-electromotive force becomes large, and thereby, the current flowing in the stator winding 3 becomes small compared with the first operating mode. Therefore, in the second operating mode, the ripple becomes smaller than that of the first operating mode. Accordingly, in the second operating mode, it is more difficult to operate the overcurrent protection block 17 in comparison with the first operating mode.

Apart from the aforementioned explanation, wherein the timer 15 consists of a hardware as shown by FIG. 2, an alternative construction may be such that the timer 15 is formed by a software such as a predetermined program.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

I claim:

1. A direct current brushless motor comprising:

a rotor having a permanent magnet, a stator winding arranged in interlinkage with a magnet field generated by said permanent magnet, and a control means for controlling a commutation of current flowing in said stator winding, a duty ratio of an applied voltage to said stator winding, and a carrier period for said duty ratio, said control means switching over between a first operating mode at a starting operation and a second operating mode at an ordinary operation in accordance with at least one of a rotational speed of said rotor and time length from starting of said first starting mode, and said control means adjusting said carrier period so that a first setting value to be adjusted in said first operating mode is larger than a second setting value to be adjusted in said second operating mode.

2. A direct current brushless motor in accordance with claim 1, wherein said control means has a commutation control block for controlling said commutation and a duty ratio control block for controlling said duty ratio and said carrier period, and said duty ratio control block includes a timer for adjusting said carrier period and either time lengths of an ON-duty and an OFF-duty in said duty ratio.

3. A direct current brushless motor comprising:

a rotor having a permanent magnet, a stator winding arranged in interlinkage with a magnet field generated by said permanent magnet, a semiconductor commutator means having plural switching elements, and said semiconductor commutator means for applying a voltage in accordance with pulse width modulation to said stator winding, a control means for controlling a commutation of current flowing in said stator winding, a duty ratio of said voltage to said stator winding, and a carrier period for said duty ratio, said control means switching over between a first operating mode at a starting operation and a second operating mode at an ordinary operation in accordance with at least one of a rotational speed of said rotor and time length from starting of said first starting mode, and said control means adjusting said carrier period so that a first setting value to be adjusted in said first operating mode is larger than a second setting value to be adjusted in said second operating mode, and an overcurrent protection means protecting overcurrent for said stator winding and said semiconductor commutator means.

4. A direct current brushless motor in accordance with claim 2, wherein said control means has a commutation control block for controlling said commutation and a duty ratio control block for controlling said duty ratio and said carrier period, and said duty ratio control block includes a timer for adjusting said carrier period and either time lengths of an ON-duty and an OFF-duty in said duty ratio.

5. Driving method for a direct current brushless motor, said driving method comprising the steps of:

determining whether an operating mode is a first operating mode at a starting operation, in the case that said operating mode is said first operating mode, adjusting a first setting value of a carrier period to a control means for controlling a commutation of current flowing in a stator winding, a duty ratio of an applied voltage to said stator winding, and a carrier period for said duty ratio, and in the case that said operating mode is a second operating mode at an ordinary operation, adjusting a second setting value of a carrier period, which is smaller than said first setting value, to said control means.

* * * * *